(12) United States Patent
Park et al.

(10) Patent No.: US 12,278,057 B2
(45) Date of Patent: Apr. 15, 2025

(54) CERAMIC ELECTRONIC COMPONENT INCLUDING BARIUM CALCIUM TITANATE

(71) Applicant: SAMSUNG ELECTRO-MECHANICS CO., LTD., Suwon-si (KR)

(72) Inventors: Jeong Bong Park, Suwon-si (KR); Han Bok Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 271 days.

(21) Appl. No.: 18/087,974

(22) Filed: Dec. 23, 2022

(65) Prior Publication Data

US 2023/0290574 A1 Sep. 14, 2023

(30) Foreign Application Priority Data

Mar. 8, 2022 (KR) .................. 10-2022-0029557

(51) Int. Cl.
*H01G 4/30* (2006.01)
*H01G 4/12* (2006.01)
*H01G 4/224* (2006.01)
*H01G 4/012* (2006.01)

(52) U.S. Cl.
CPC ............. *H01G 4/30* (2013.01); *H01G 4/1227* (2013.01); *H01G 4/224* (2013.01); *H01G 4/012* (2013.01)

(58) Field of Classification Search
None
See application file for complete search history.

(56) References Cited

U.S. PATENT DOCUMENTS

2018/0182555 A1* 6/2018 Kowase .................. H01G 4/30
2019/0180935 A1* 6/2019 Kato ....................... H01G 4/14

FOREIGN PATENT DOCUMENTS

| JP | 5-299286 A | 11/1993 |
|---|---|---|
| JP | 2007-266223 A | 10/2007 |
| KR | 10-2006-0110603 A | 10/2006 |

* cited by examiner

*Primary Examiner* — Eric W Thomas
(74) *Attorney, Agent, or Firm* — Morgan, Lewis & Bockius LLP

(57) ABSTRACT

A ceramic electronic component, includes: a body including a dielectric layer and first and second internal electrodes alternately disposed with the dielectric layer interposed therebetween in a first direction; a first external electrode connected to the first internal electrode; and a second external electrode connected to the second internal electrode, wherein the body includes a capacitance formation portion including the first and second internal electrodes, and a cover portion disposed on both end surfaces of the capacitance formation portion in the first direction, the dielectric layer includes $BaTiO_3$ and $(Ba_{1-x}Ca_x)TiO_3$ ($0.01 \leq x \leq 0.15$), and the cover portion includes $BaTiO_3$, and in a cross-section of the body in the first and third directions, a ratio of an area occupied by pores in the cover portion is S1, and a ratio of an area occupied by pores in the dielectric layer of the capacitance formation portion is S2, S1<S2.

20 Claims, 7 Drawing Sheets

K1

K2

CERAMIC ELECTRONIC COMPONENT INCLUDING BARIUM CALCIUM TITANATE

CROSS-REFERENCE TO RELATED APPLICATION(S)

This application claims benefit of priority to Korean Patent Application No. 10-2022-0029557 filed on Mar. 8, 2022 in the Korean Intellectual Property Office, the disclosure of which is incorporated herein by reference in its entirety.

TECHNICAL FIELD

The present disclosure relates to a ceramic electronic component.

A multilayer ceramic capacitor (MLCC), a ceramic electronic component, is a chip-type condenser mounted on printed circuit boards of various electronic products such as display devices including liquid crystal displays (LCDs) and plasma display panels (PDPs), computers, smartphones, cell phones, and the like, to allow electricity to be charged therein and discharged therefrom.

In general, a dielectric material used for a multilayer ceramic high-capacity capacitor, or the like, is a ferroelectric material based on barium titanate ($BaTiO_3$), which has a high dielectric constant at room temperature, a relatively small dissipation factor, and excellent insulation resistance characteristic. Recently, due to the development of the electric field industry, the demand for ceramic electronic components having excellent capacity and temperature characteristics and reliability at withstand voltage and high temperature is rapidly increasing. Accordingly, in addition to general high-capacity ceramic electronic components guaranteed up to 85° C. according to the EIA standard, X7R guaranteed up to 125° C., X8R guaranteed up to 150° C., and further, X9M ceramic electronic components guaranteed up to 200° C. are required.

However, since barium titanate (BT, $BaTiO_3$) has a Curie temperature of only 125° C., there was a limit in that a dielectric constant thereof is rapidly lowered above the temperature. In order to solve this problem, a method, of improving a high temperature coefficient of capacitance (TCC) by applying base material powder mixed with barium titanate (BCT, $(Ba_{1-x}Ca_x)TiO_3$) and barium titanate (BT, $BaTiO_3$) in which Ca is dissolved as base material powder, is being researched.

However, when using base material powder mixed with BCT and BT, TCC can be improved, but moisture resistance reliability may be reduced, so a method to solve this issue is required.

SUMMARY

An aspect of the present disclosure is to provide a ceramic electronic component having excellent moisture-resistance reliability.

An aspect of the present disclosure is to provide a ceramic electronic component having excellent high-temperature reliability.

However, the object of the present disclosure is not limited to the above, and will be more easily understood in the course of describing specific embodiments of the present disclosure.

According to an aspect of the present disclosure, a ceramic electronic component, includes: a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the first internal electrode; and a second external electrode disposed on the fourth surface and connected to the second internal electrode, wherein the body includes a capacitance formation portion including the first and second internal electrodes to form capacitance, and a cover portion disposed on both end surfaces of the capacitance formation portion in the first direction, the dielectric layer includes $BaTiO_3$ and $(Ba_{1-x}Ca_x)TiO_3$, $0.01 \leq x \leq 0.15$, the cover portion includes $BaTiO_3$, and in a cross-section of the body in the first and third directions, a ratio of an area occupied by pores in the cover portion is S1, a ratio of an area occupied by pores in the dielectric layer is S2, and S1<S2.

According to an aspect of the present disclosure, a ceramic electronic component, includes: a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the first internal electrode; and a second external electrode disposed on the fourth surface and connected to the second internal electrode, wherein the body includes a capacitance formation portion including the first and second internal electrodes to form capacitance, a cover portion disposed on both end surfaces of the capacitance formation portion in a first direction, and a margin portion disposed on both side surfaces of the capacitance formation portion in a third direction, the dielectric layer includes $BaTiO_3$ and $(Ba_{1-x}Ca_x)TiO_3$, $0.01 \leq x \leq 0.15$, and the margin portion includes $BaTiO_3$, and in a cross-section of the body in the first and third directions, a ratio of an area occupied by pores in the margin portion is S3, a ratio of an area occupied by pores in the dielectric layer is S2, S3<S2.

According to an aspect of the present disclosure, a ceramic electronic component, includes: a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the first internal electrode; and a second external electrode disposed on the fourth surface and connected to the second internal electrode, wherein the body includes a capacitance formation portion including the first and second internal electrodes to form capacitance, and a margin portion disposed on both side surfaces of the capacitance formation portion in the third direction, the dielectric layer includes $BaTiO_3$ and $(Ba_{1-x}Ca_x)TiO_3$, $0.01 \leq x \leq 0.15$, and the margin portion includes $BaTiO_3$ and is free of $(Ba_{1-x}Ca_x)TiO_3$, $0.01 \leq x \leq 0.15$.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
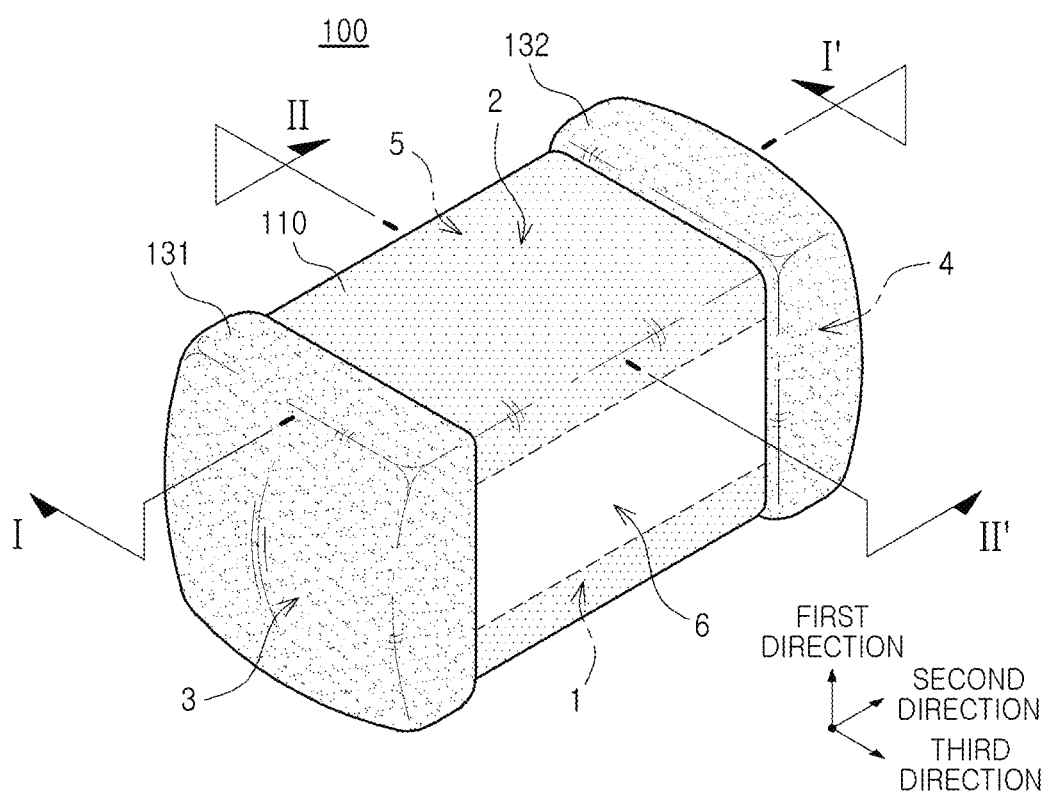
FIG. 1 is a schematic perspective view of a ceramic electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawings, a first direction may refer to a stacking direction or a thickness (T) direction, a second direction may refer to a length (L) direction, and a third direction may refer to a width (W) direction.

Ceramic Electronic Component

FIG. 1 schematically illustrates a perspective view of a ceramic electronic component according to an embodiment of the present disclosure.

Figure 2:
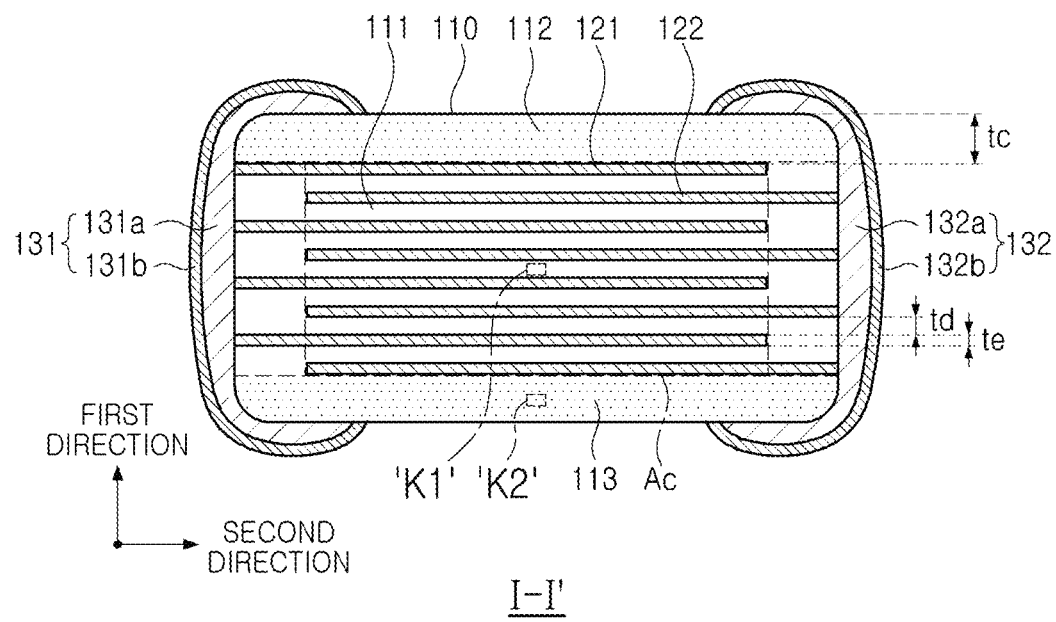
FIG. 2 schematically illustrates a cross-sectional view taken along line I-I' of FIG. 1.

FIG. 2 schematically illustrates a cross-sectional view taken along line I-I' of FIG. 1.

Figure 3:
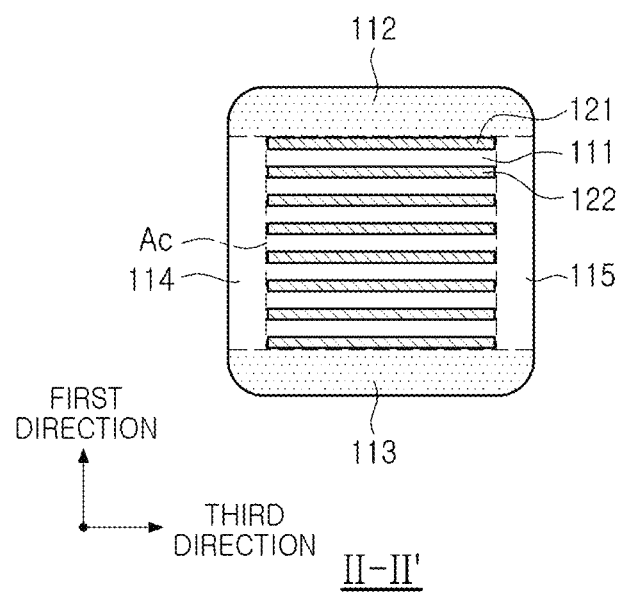
FIG. 3 schematically illustrates a cross-sectional view taken along line II-II' of FIG. 1.

FIG. 3 schematically illustrates a cross-sectional view taken along line II-II' of FIG. 1.

Figure 4:
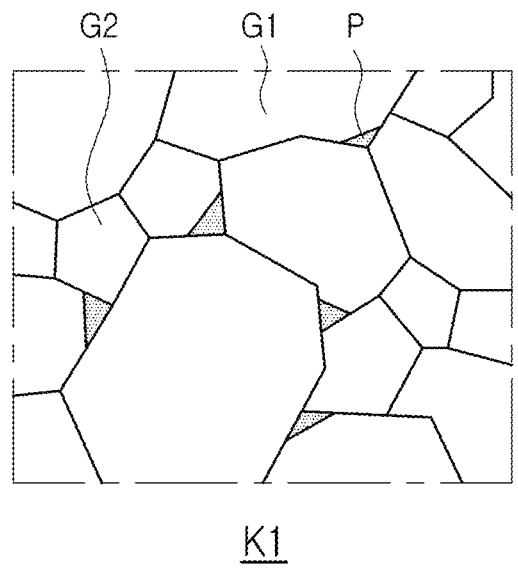
FIG. 4 is an enlarged view of region K1 of FIG. 2.

FIG. 4 is an enlarged view of region K1 of FIG. 2.

Figure 5:
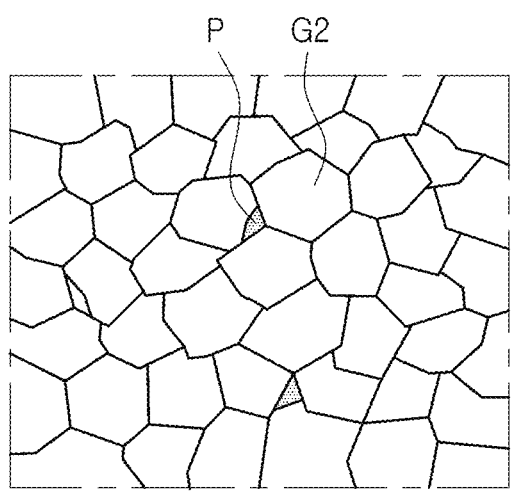
FIG. 5 is an enlarged view of region K2 of FIG. 2.

FIG. 5 is an enlarged view of an area K2 of FIG. 2.

Hereinafter, a ceramic electronic component 100 according to an embodiment of the present disclosure will be described in detail with reference to FIGS. 1 to 5.

In addition, although a multi-layer ceramic capacitor (hereinafter referred to as 'MLCC') has been described as an example of a ceramic electronic component, an embodiment of the present disclosure not limited thereto, and it may be applied to various ceramic electronic components using a ceramic material, for example, an inductor, a piezoelectric element, a varistor, a thermistor, or the like.

According to an embodiment of the present disclosure, a ceramic electronic component 100, may include: a body 110 including a dielectric layer 111 and first and second internal electrodes 121 and 122 alternately disposed with the dielectric layer interposed therebetween in a first direction, the body having first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 disposed on the third surface and connected to the first internal electrode; and a second external electrode 132 disposed on the fourth surface and connected to the second internal electrode, wherein the body includes a capacitance formation portion Ac including the first and second internal electrodes to form capacitance, and cover portions 112 and 113 disposed on both end surfaces of the capacitance formation portion in a first direction, a dielectric layer 111 of the capacitance formation portions include $BaTiO_3$ and $(Ba_{1-x}Ca_x)TiO_3(0.01 \leq x \leq 0.15)$, and the cover portions 112 and 113 include $BaTiO_3$, and in a cross-section of the body in the first and third directions, when a ratio of an area occupied by pores in the cover portions 112 and 113 is S1, and a ratio of an area occupied by pores in the dielectric layer of the capacitance formation portion is S2, S1<S2.

In the body 110, a dielectric layer 111 and internal electrodes 121 and 122 may be alternately stacked.

The body 110 is not limited to a particular shape, and may have a hexahedral shape or a shape similar to a hexahedral shape, as illustrated in the drawings. The body 110 may not have the shape of a hexahedron having perfectly straight lines because ceramic powder particles included in the body 110 may contract in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

The plurality of dielectric layers 111 forming the body 110 are in a sintered state, and a boundary between adjacent dielectric layers 111 may be integrated, such that it may be difficult to confirm without using a scanning electron microscope (SEM). The number of stacked dielectric layers does not need to be particularly limited and may be determined in consideration of the size of the ceramic electronic component. For example, a body may be formed by stacking 400 or more dielectric layers.

The body 110 may include a capacitance formation portion Ac disposed inside the body 110, and including a first internal electrode 121 and a second internal electrode 122 to form capacitance, and cover portions 112 and 113 disposed on both end surfaces of the capacitance formation portion in a first direction.

In addition, the capacitance formation portion Ac, which contributes to formation of capacitance of a capacitor, may be formed by repeatedly laminating a plurality of first and second internal electrodes 121 and 122 with the dielectric layer 111 interposed therebetween. The dielectric layer 111 of the capacitance formation portion Ac may include $BaTiO_3$ and $(Ba_{1-x}Ca_x)TiO_3(0.01 \le x \le 0.15)$. The dielectric layer 111 of the capacitance formation portion Ac may be formed using a raw material in which various ceramic additives, organic solvents, binders, dispersants, and the like, are added to base material powder in which $BaTiO_3$ powder and $(Ba_{1-x}Ca_x)TiO_3$ $(0.01 \le x \le 0.15)$ powder are mixed.

The cover portions 112 and 113 may include an upper cover portion 112 disposed above the capacitance formation portion Ac in a first direction, and a lower cover portion 113 disposed below the capacitance formation portion Ac in a first direction. The cover portions 112 and 113 may include barium titanate ($BaTiO_3$). In addition, the cover portions 112 and 113 may not include $(Ba_{1-x}Ca_x)TiO_3$. The cover portions 112 and 113 may be formed using a raw material in which various ceramic additives, organic solvents, binders, dispersants, and the like are added to $BaTiO_3$ powder.

Barium titanate (BT, $BaTiO_3$) has a Curie temperature of only 125° C., so there is a limit in that a dielectric constant is rapidly lowered above the temperature. In order to solve this problem, a method for improving a change rate of high-temperature coefficient of capacitance (TCC) is being researched by applying base material powder mixed with barium titanate (BCT, $(Ba_{1-x}Ca_x)TiO_3$) in which Ca is dissolved as the base material powder and barium titanate (BT, $BaTiO_3$).

However, when a cover portion constituting an exterior of the body is formed by applying a base material powder mixed with barium titanate (BCT, $(Ba_{1-x}Ca_x)TiO_3$) and barium titanate (BT, $BaTiO_3$) in which Ca is dissolved, pores may be generated in the cover portion, so that density may be lowered, and the pores in the cover portion may act as a moisture permeation path, so that moisture resistance reliability may be reduced.

That is, when the body 110 is entirely formed by applying the base material powder mixed with barium titanate (BCT, $(Ba_{1-x}Ca_x)TiO_3$) and barium titanate (BT, $BaTiO_3$) in which Ca is dissolved, TCC may be improved, but, the moisture resistance reliability could be lowered.

Accordingly, in an embodiment, $BaTiO_3$ may be included in the cover portions 112 and 113 to lower porosity of the cover portions 112 and 113, and $BaTiO_3$ and $(Ba_{1-x}Ca_x)TiO_3$ $(0.01 \le x \le 0.15)$ may be included in the dielectric layer 111 of the capacitance formation portion Ac, to ensure high-temperature reliability and moisture resistance reliability at the same time.

The cover portions 112 and 113 may contain $BaTiO_3$ as a main component, and may contain Mg, Dy, Y, Mn, Cr, V, S1, Al, Zr, and the like, as sub components. The dielectric layer 111 of the capacitance formation portion Ac may contain $BaTiO_3$ and $(Ba_{1-x}Ca_x)TiO_3(0.01 \le x \le 0.15)$ as main components, and contain Mg, Dy, Y, Mn, Cr, V, S1, Al, Zr, and the like as sub components. Here, the meaning of the main component may mean that the number of moles of the remaining components excluding a main component relative to 100 moles of the main component is 30 moles or less. In the present disclosure, $(Ba_{1-x}Ca_x)TiO_3$ may preferably have a Ca denaturation amount x in a range of 0.01 to 0.15.

$BaTiO_3$ and $(Ba_{1-x}Ca_x)TiO_3(0.01 \le x \le 0.15)$ may be prepared by a hydrothermal synthesis method, a solid-phase method, a co-precipitation method, a sol-gel method, but an embodiment thereof is not limited thereto.

Meanwhile, a thickness of the cover portions 112 and 113 does not need to be particularly limited. However, in a ceramic electronic component having a size, greater than or equal to 1608 (length×width, 1.6 mm×0.8 mm), in general, a thickness "tc" of the cover portions 112 and 113 may be 100 μm or more.

The average thickness "tc" of the cover portion 112 or 113 may refer to a size in the first direction, and may be an average value of sizes, in the first direction, of the cover portions 112 and 113 measured at five points disposed at equal intervals above or below the capacitance formation portion Ac.

In addition, margin portions 114 and 115 may be disposed on a side surface of the capacitance formation portion Ac.

The margin portions 114 and 115 may include a first margin portion 114, disposed on the fifth surface 5 of the body 110, and a second margin portion 115, disposed on the sixth surface 6 of the body 110. That is, the margin portions 114 and 115 may be disposed on both end surfaces of the body 110 in a width direction.

The margin portions 114 and 115 may refer to regions between both ends of the first and second internal electrodes 121 and 122 and a boundary surface of the body 110 in a cross-section of the body 110 taken in the width-thickness (W-T) directions, as illustrated in FIG. 3.

The margin portions 114 and 115 may basically serve to prevent damage to the internal electrodes caused by physical or chemical stress.

The margin portions 114 and 115 may be formed by applying a conductive paste to ceramic green sheets, except for portions in which the margin portions are to be formed, to form the internal electrodes.

In addition, further to forming the internal electrodes 121 and 122, the margin portions 114 and 115 may be formed by laminating ceramic green sheets, cutting the laminated ceramic green sheets to expose the internal electrodes to the fifth and sixth surfaces 5 and 6 of the body 110, and then laminating a single dielectric layer or two or more dielectric layers on both side surfaces of the capacitance formation portion Ac in the third direction (the width direction).

The margin portions 114 and 115 may include $BaTiO_3$, or both $BaTiO_3$ and $(Ba_{1-x}Ca_x)TiO_3(0.01 \le x \le 0.15)$. The margin portions 114 and 115 may have substantially the same composition as the cover portions 112 and 113, or may have substantially the same composition as the capacitance formation portion Ac. When the margin portions 114 and 115 include $BaTiO_3$ as a main component, moisture-resistance reliability may be further improved.

In a cross-section of the body 110 in the first and third directions, a ratio of an area occupied by pores P among the cover portions 112 and 113 is S1, and a ratio of an area occupied by pores P among the dielectric layer 111 of the capacitance formation portion Ac is S2, S1<S2 may be satisfied. As S1<S2 is satisfied, density of the cover portions 112 and 113 may be improved to block a moisture permeation path, thereby improving the moisture resistance reliability.

In an embodiment, S1 may be 0.2 area % or less, and S2 may be exceeding 0.2 area % and may be 0.4 area % or less. When S1 exceeds 0.2 area %, an effect of improving the moisture-resistance reliability may be insufficient. When S2 is 0.2 area % or less, an effect of improving the high-temperature reliability may be insufficient, and when S4 exceeds 0.4 area %, a dielectric constant or breakdown voltage may decrease.

Figure 10:
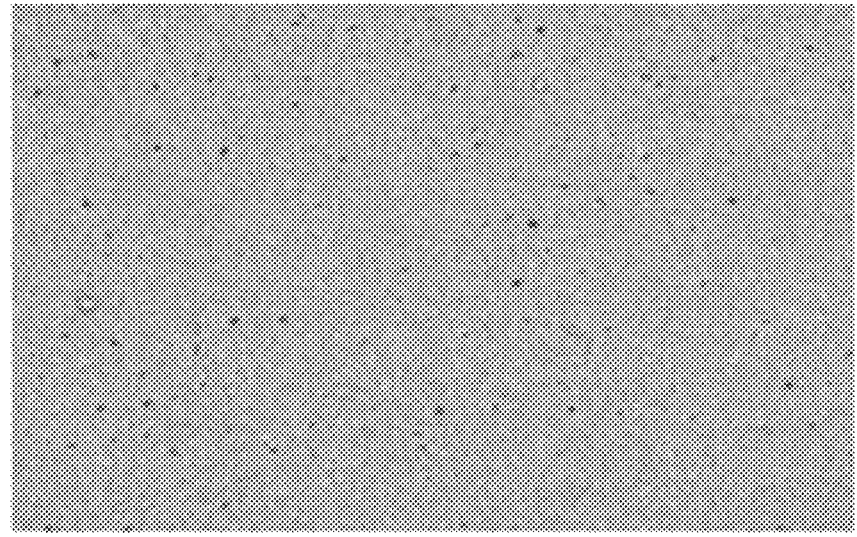
FIG. 10 is an image scanned with a scanning electron microscope of a cross section of a cover portion containing $BaTiO_3$ and $(Ba_{1-x}Ca_x)TiO_3(0.01 \leq x \leq 0.15)$.
Figure 11:
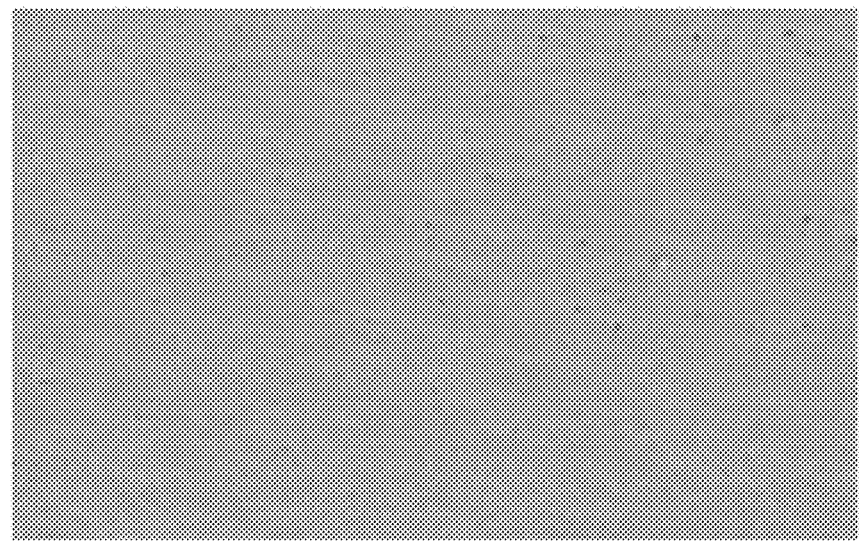
FIG. 11 is a scanning electron microscope image of a cross-section of a cover portion containing $BaTiO_3$.

FIG. 10 is an image obtained by scanning a cross-section of a cover portion including $BaTiO_3$ and $(Ba_{1-x}Ca_x)TiO_3$ ($0.01 \leq x \leq 0.15$). FIG. 11 is an image obtained by scanning a cross-section of a cover portion including $BaTiO_3$. A size of a sample chip in FIGS. 10 and 11 was manufactured to be 2012 (length×width, 2.0 mm×1.2 mm), and a thickness of the sample chip was manufactured to be 1.2 mm. Comparing FIGS. 10 and 11, it can be seen that there exist more pores in FIG. 10 including both $BaTiO_3$ and $(Ba_{1-x}Ca_x)TiO_3$ ($0.01 \leq x \leq 0.15$) than those in FIG. 11.

Figure 12:
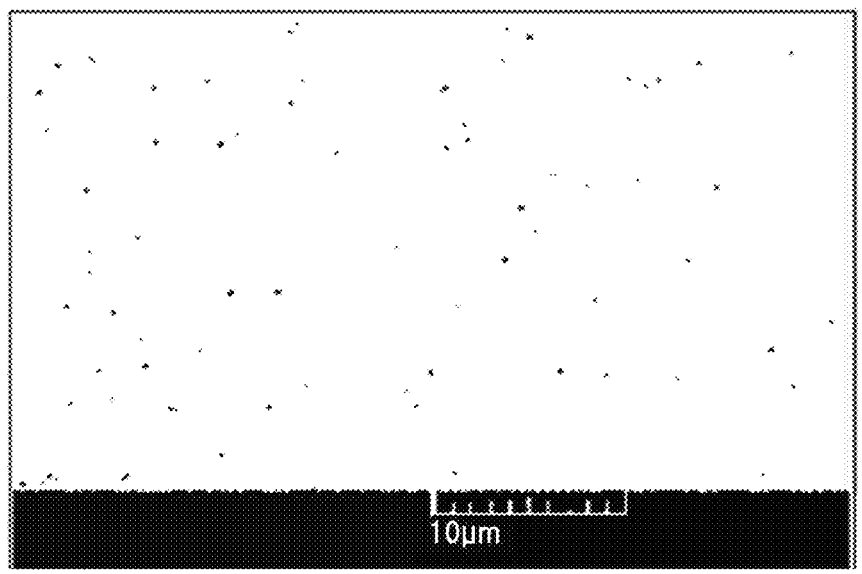
FIG. 12 is an analysis of a ratio of pores in the image of FIG. 10 using an image analysis program.
Figure 13:
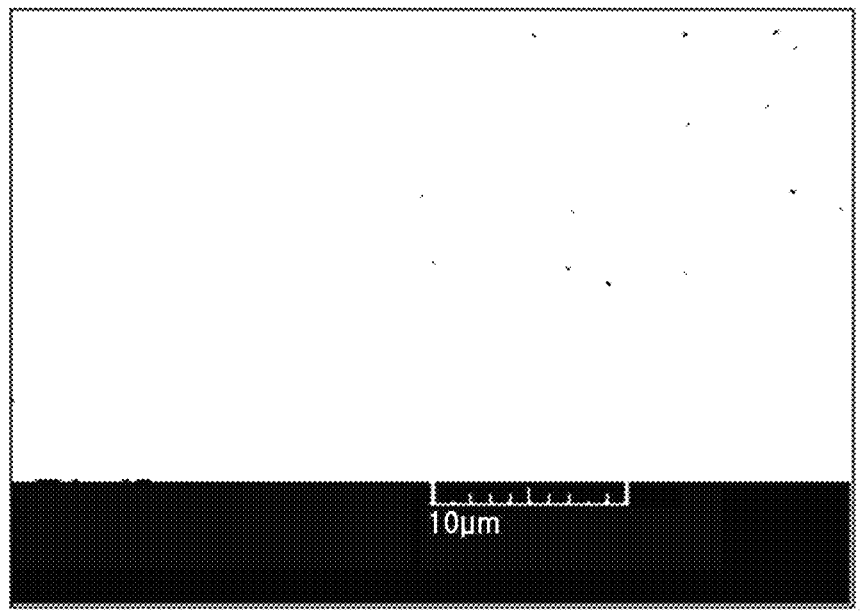
FIG. 13 is an analysis of a ratio of pores in the image of FIG. 11 using an image analysis program.

For S1 and S2, after obtaining the images illustrated in FIGS. 10 and 11, the ratio of pores may be analyzed using the images using an image analysis program. For example, a proportion of pores may be analyzed using an ImageJ program. Other methods and/or tools appreciated by one of ordinary skill in the art, even if not described in the present disclosure, may also be used. FIGS. 12 and 13 illustrate a ratio of pores in the images of FIGS. 10 and 11, respectively, analyzed using an ImageJ program. As illustrated in FIGS. 12 and 13, pores are denoted in black, and a ratio of the pores may be confirmed by measuring a ratio of an area that appears black. In the case of FIG. 12, a ratio of pores was measured to be 0.38 area %, and in the case of FIG. 13, a ratio of pores was measured to be 0.09 area %.

In addition, as a result of evaluating high-temperature reliability and moisture-resistance reliability for the sample chip of FIG. 10 and the sample chip of FIG. 11, it was confirmed that high-temperature reliability was at a similar level, but the sample chip of FIG. 11 was excellent in moisture-resistance reliability.

As for the moisture-resistance reliability, at a temperature of 85° C. and relative humidity of 85%, by applying a voltage of 4V for 12 hours, a sample chip of which an insulation resistance value was lowered to $\frac{1}{10}$ or less, compared to an initial value, was determined to be defective, in the sample chip of FIG. 10, 10 sample chips out of a total of 400 sample chips were determined to have poor moisture resistance reliability, but in the sample chip of FIG. 11, 0 sample chips out of a total of 400 sample chips were determined to be defective.

In an embodiment, the dielectric layer 111 of the capacitance formation portion Ac may contain $(Ba_{1-x}Ca_x)TiO_3$ ($0.01 \leq x \leq 0.15$) in an amount of 30 moles or more and 300 moles or less relative to 100 moles of $BaTiO_3$.

When $(Ba_{1-x}Ca_x)TiO_3$ ($0.01 \leq x \leq 0.15$) is less than 30 moles relative to 100 moles of $BaTiO_3$, an effect of improving the high-temperature reliability may be insufficient, and when $(Ba_{1-x}Ca_x)TiO_3$ ($0.01 \leq x \leq 0.15$) exceeds 300 moles, a dielectric constant may decrease. More preferably, a dielectric layer 111 of the capacitance formation portion Ac may contain $(Ba_{1-x}Ca_x)TiO_3$ ($0.01 \leq x \leq 0.15$) in an amount of 80 mol or more and 220 mol or less relative to 100 mol of $BaTiO_3$, even more preferably may contain $(Ba_{1-x}Ca_x)TiO_3$ ($0.01 \leq x \leq 0.15$) in an amount of 100 mol or more and 150 mol or less, relative to 100 mol of $BaTiO_3$.

In an embodiment, when a crystal grain containing $(Ba_{1-x}Ca_x)TiO_3$ ($0.01 \leq x \leq 0.15$) as a main component is a first crystal grain G1, and a crystal grain containing $BaTiO_3$ as a main component as a second crystal grain G2, the dielectric layer 111 of the capacitance formation portion may include first and second crystal grains G1 and G2, and the cover portions 112 and 113 may include a second crystal grain G2. Here, as the cover portions 112 and 113 do not include $(Ba_{1-x}Ca_x)TiO_3$ ($0.01 \leq x \leq 0.15$), the cover portions 112 and 113 may not include the first crystal grain G1. Here, a meaning of the main component may mean that the number of moles of other components relative to 100 moles of the main component is 30 moles or less.

In an embodiment, the average size of the first crystal grains G1 may be greater than the average size of the second crystal grains G2. Since grains of BCT powder are greater in size than those of BT powder, even after sintering, the size of the first crystal grains G1, which are crystal grains containing $(Ba_{1-x}Ca_x)TiO_3$ ($0.01 \leq x \leq 0.15$) as a main component, may be greater than the size of the second crystal grains G2, and pores P may be formed due to this size difference.

In an embodiment, an average size of the first crystal grains G1 may be 210 to 340 nm, and an average size of the second crystal grains G2 may be 160 to 290 nm.

When a straight line is drawn from one point of a grain boundary of the first and second crystal grains G1 and G2 to another point, a line having the largest value may be a major axis, and a line among straight lines, orthogonal to the major axis, having the largest value may be a minor axis, and an average value of the major axis and the minor axis may be used to determine a size of a crystal grain. A value obtained by averaging the sizes of 500 or more crystal grains may be used as an average particle diameter of dielectric crystal grains.

The grain sizes of the first and second crystal grains G1 and G2 may be measured in the image obtained by scanning the cross-section of the body 110 in the width and thickness direction (W-T) with a scanning electron microscope (SEM). In this case, a magnification may be differently set depending on the size of the crystal grains, and the magnification may be adjusted so that the size of 500 or more crystal grains can be measured. However, it is not necessary to be measured by adjusting the magnification so that 500 or more crystal grains are included in one image, and the magnification may be measured in the plurality of images by adjusting the magnification so that the total number of crystal grains included in the plurality of images is 500 or more. Other methods and/or tools appreciated by one of ordinary skill in the art, even if not described in the present disclosure, may also be used.

An average thickness "td" of the dielectric layer 111 does not need to be particularly limited. For example, the average thickness "td" of the dielectric layer 111 may be 0.5 to 3 μm.

The average thickness "td" of the dielectric layer 111 may refer to an average thickness of the dielectric layer 111 disposed between the first and second internal electrodes 121 and 122.

The average thickness "td" of the dielectric layer 111 may be measured from an image obtained by scanning a cross section of the body 110 in the length and thickness directions (L-T) with a scanning electron microscope (SEM) of 10,000 magnification. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average thickness of ten dielectric layers is measured, the average thickness of the dielectric layers may further be generalized.

The internal electrodes 121 and 122 may include first and second internal electrodes 121 and 122. The first and second internal electrodes 121 and 122 may be alternately disposed to oppose each other with the dielectric layer 111, constituting the body 110, interposed therebetween, and may be exposed to the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance. In addition, the first and second internal electrodes 121 and 122 may be disposed to be spaced apart from the fifth and sixth surfaces of the body 110.

In this case, the first and second internal electrodes 121 and 122 may be electrically separated from each other by the dielectric layer 111 disposed therebetween.

The body 110 may be formed by alternately laminating a ceramic green sheet on which the first internal electrode 121 is printed, and a ceramic green sheet and a ceramic green sheet on which the second internal electrode 122 is printed, and then sintering the laminated ceramic green sheets.

A material of the internal electrodes 121 and 122 is not particularly limited, and may be a material having excellent electrical conductivity. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for internal electrodes may be a screen printing method, a gravure printing method, or the like, but embodiments of the present disclosure are not limited thereto.

An average thickness "te" of the internal electrode 121 and 122 is not particularly limited. For example, the average thickness "te" of the internal electrode 121 and 122 may be 0.6 μm or more and 2.0 μm or less.

The average thickness "te" of the internal electrode 121 and 122 may be measured from an image obtained by scanning a cross-section of the body 110 in the length and thickness directions (L-T) with a scanning electron microscope (SEM) of 10,000 magnification. More specifically, an average value may be measured by measuring thicknesses of one internal electrode at 30 points positioned at equal intervals in the length direction in the scanned image. The 30 points positioned at equal intervals may be designated in the capacitance formation portion Ac. In addition, when an average thickness of ten internal electrodes is measured, the average thickness of the internal electrodes may further be generalized.

The external electrodes 131 and 132 may be disposed on the third surface 3 and the fourth surface 4 of the body 110.

The external electrode 131 and 132 may include first and second external electrodes 131 and 132, respectively disposed on the third and fourth surfaces 3 and 4 of the body 110, to be respectively connected to the first and second internal electrodes 121 and 122.

Referring to FIG. 1, the external electrodes 131 and 132 may be disposed to cover both end surfaces of the side margin portions 114 and 115 in a second direction.

In the present embodiment, a structure in which the ceramic electronic component 100 has two external electrodes 131 and 132, but the number and shape of the external electrodes 131 and 132 may vary depending on the shape of the internal electrodes 121 and 122 or other purposes.

The external electrodes 131 and 132 may be formed of any material having electrical conductivity, such as a metal, and a specific material of each of the external electrodes 131 and 132 may be determined in consideration of electrical characteristics, structural stability, and the like.

Furthermore, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

As a more specific example of the electrode layers 131a and 132a, the electrode layers 131a and 132a may be sintered electrodes including conductive metal and glass, or resin-based electrodes including conductive metal and a resin.

In addition, the electrode layers 131a and 132a may have a shape in which a sintered electrode and a resin-based electrode are sequentially formed on a body. In addition, the electrode layers 131a and 132a may be formed by a method of transferring a sheet including conductive metal onto the body, or a method by transferring a sheet including conductive metal onto the sintered electrode.

As conductive metal included in the electrode layers 131a and 132a, a material having excellent electrical conductivity may be used, and the material is not particularly limited. For example, the conductive metal may be at least one of nickel (Ni), copper (Cu), and alloys thereof.

The plating layers 131b and 132b may serve to improve mounting characteristics. A type of the plating layers 131b and 132b is not particularly limited, and may be a plating layer including at least one of Ni, Sn, Pd, and alloys thereof, and may be formed of a plurality of layers.

As a more specific example of the plating layers 131b and 132b, the plating layers 131b and 132b may be a Ni plating layer or a Sn plating layer, and may have a form in which a Ni plating layer and a Sn plating layer are sequentially formed on the electrode layers 131a and 132a, and may have a form in which a Sn plating layer, a Ni plating layer, and a Sn plating layer are sequentially formed. In addition, the plating layers 131b and 132b may include a plurality of Ni plating layers and/or a plurality of Sn plating layers.

A size of the ceramic electronic component 100 does not need to be limited.

However, the ceramic electronic component 100 of the present disclosure may be preferably applied to a ceramic electronic component 100 having a size of 1608 (length× width, 1.6 mm×0.8 mm) or more, which is the size of a product requiring special high-temperature reliability.

When the ceramic electronic component 100 has a length of 1.54 mm or more and a width of 0.72 mm or more in consideration of a manufacturing error, a size of an external electrode, and the like, it may be preferably applied. Here, the length of the multilayer electronic component 100 may refer to a maximum size of the ceramic electronic component 100 in the second direction, and the width of the ceramic electronic component 100 may refer to a maximum size of the ceramic electronic component 100 in the third direction.

Figure 6:
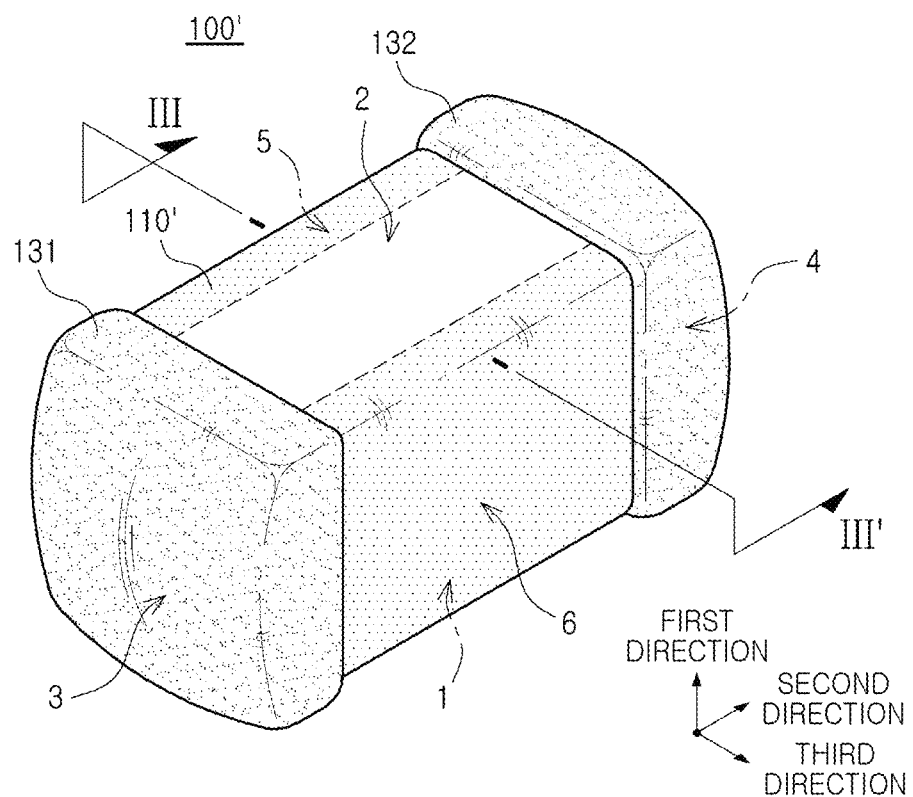
FIG. 6 is a schematic perspective view of a ceramic electronic component according to an embodiment of the present disclosure.

FIG. 6 schematically illustrates a perspective view of a ceramic electronic component 100' according to an embodiment of the present disclosure.

Figure 7:
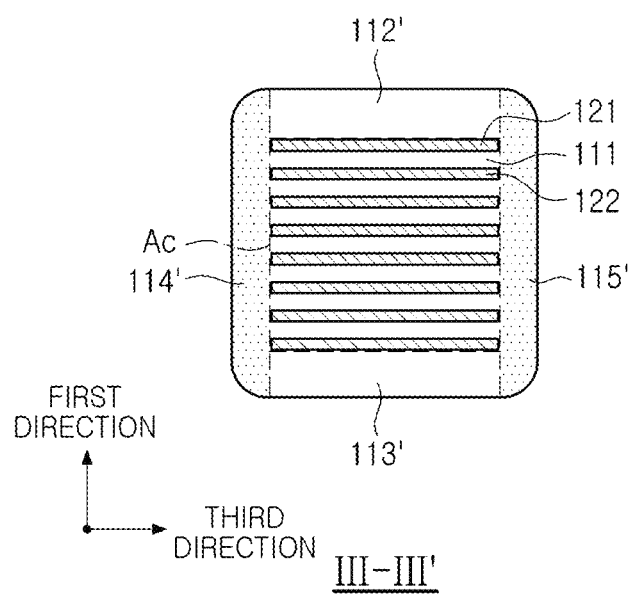
FIG. 7 schematically illustrates a cross-sectional view taken along line III-III' of FIG. 6.

FIG. 7 schematically illustrates a cross-sectional view taken along line III-III' of FIG. 6.

Hereinafter, a ceramic electronic component 100' according to an embodiment of the present disclosure will be described in detail with reference to FIGS. 6 and 7. However, a content that overlaps with the above description will be omitted.

The ceramic electronic component 100' according to an embodiment of the present disclosure may include: a body 110' including a dielectric layer 111 and first and second internal electrodes 121 and 122 alternately disposed with the dielectric layer interposed therebetween in a first direction, the body 110' having first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 disposed on the third surface and connected to the first internal electrode; and a second external electrode 132 disposed on the fourth surface and connected to the second internal electrode, wherein the body may include a capacitance formation portion Ac including the first and second internal electrodes to form capacitance, cover portions 112' and 113' disposed on both end surfaces of the capacitance formation portion in a first direction, and margin portions 114' and 115' disposed on both end surfaces of the capacitance formation portion in a third direction, and a dielectric layer 111 of the capacitance formation portion contains $BaTiO_3$ and $(Ba_{1-x}Ca_x)TiO_3 (0.01 \leq x \leq 0.15)$, the margin portions 114' and 115' contain $BaTiO_3$, and when a ratio of an area occupied by pores P among the margin portions 114' and 115' in a cross-section of the body in the first and third directions is S3, and when a ratio of an area occupied by pores P among the dielectric layers 111 of the capacitance formation portion Ac is S2, S3<S2 may be satisfied.

When the margin portions 114' and 115' constituting an exterior of the body are formed by applying base material powder mixed with barium titanate (BCT, $(Ba_{1-x}Ca_x)TiO_3$) in which Ca is dissolved and barium titanate (BT, $BaTiO_3$), as the number of pores in the margin portion 114' and 115' increases, density may decrease, and the pores in the margin portions 114' and 115' may act as a moisture penetration path, thereby reducing moisture resistance reliability.

That is, when the body 110' is entirely formed by applying a base material powder mixed with barium titanate (BCT, $(Ba_{1-x}Ca_x)TiO_3$) and barium titanate (BT, $BaTiO_3$) in which Ca is dissolved, TCC may be improved, but, the moisture resistance reliability may be reduced.

Accordingly, in an embodiment of the present disclosure, $BaTiO_3$ may be included in the margin portions 114' and 115' to lower the porosity of the margin portions 114' and 115', and $BaTiO_3$ and $(Ba_{1-x}Ca_x)TiO_3(0.01 \leq x \leq 0.15)$ may be included in the dielectric layer 111 of the capacitance formation portion Ac, to ensure high-temperature reliability and moisture-resistance reliability at the same time.

In this case, the margin portions 114' and 115' may contain $BaTiO_3$, but may not contain $(Ba_{1-x}Ca_x)TiO_3$. The margin portions 114' and 115' may contain $BaTiO_3$ as a main component, and the dielectric layer 111 of the capacitance formation portion Ac may contain $BaTiO_3$ and $(Ba_{1-x}Ca_x)TiO_3(0.01 \leq x \leq 0.15)$ as a main component.

In the cross-section of the body 110' in the first and third directions, when a ratio of an area occupied by pores P among the margin portions 114' and 115' is S3, and a ratio of an area occupied by pores P among the dielectric layers is S2, S3<S2. As S3<S2 is satisfied, by improving density of the margin portions 114' and 115', it is possible to block a moisture permeation path, thereby improving the moisture-resistance reliability.

In an embodiment, S3 may be 0.2 area % or less, and S2 may exceed 0.2 area % and may be 0.4 area % or less. When S3 exceeds 0.2 area %, an effect of improving the moisture-resistance reliability may be insufficient, and when S2 is 0.2 area % or less, an effect of improving the high-temperature reliability may be insufficient. S3 may be measured in the same way as S1 and S2 described above.

In an embodiment, when a crystal grain containing $(Ba_{1-x}Ca_x)TiO_3(0.01 \leq x \leq 0.15)$ as a main component is referred to as a first crystal grain G1 and a crystal grain containing $BaTiO_3$ as a main component is referred to as a second crystal grain G2, a dielectric layer 111 of the capacitance formation portion may include first and second crystal grains G1 and G2, and the margin portions 114' and 115' may include second crystal grain G2. That is, the dielectric layer 111 of the capacitance formation portion Ac may have a form of the dielectric crystal grain illustrated in FIG. 4, and the margin portions 114' and 115' may have a form of the dielectric crystal grain illustrated in FIG. 5.

Figure 8:
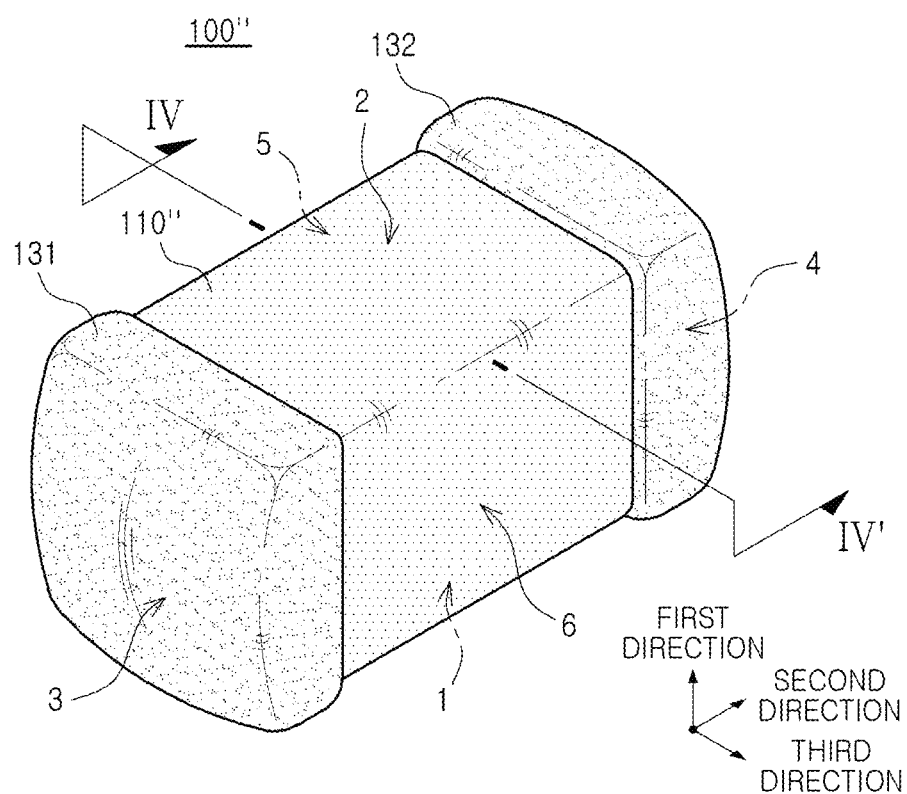
FIG. 8 is a schematic perspective view of a ceramic electronic component according to an embodiment of the present disclosure.
Figure 9:
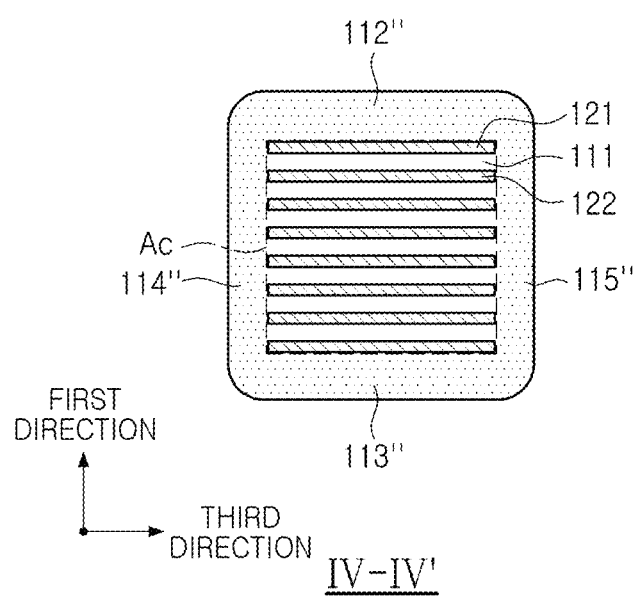
FIG. 9 is a schematic view of a cross-sectional view IV-IV' of FIG. 8.

FIG. 8 is a schematic perspective view of a ceramic electronic component 100" according to an embodiment of the present disclosure. FIG. 9 is a schematic view of a cross-sectional view IV-IV' of FIG. 8.

As illustrated in FIGS. 8 and 9, according to an embodiment of the present disclosure, a dielectric layer 111 of the capacitance formation portion $BaTiO_3$ and $(Ba_{1-x}Ca_x)TiO_3$ $(0.01 \leq x \leq 0.15)$, and cover portions 112" and 113" and margin portions 114" and 115" may include $BaTiO_3$.

As the cover portions 112" and 113" and the margin portions 114" and 115" constituting an outside of the body 110" all contain $BaTiO_3$, by lowering porosity of the cover portions 112" and 113" and the margin portions 114" and 115", moisture resistance reliability may be further improved. The cover portions 112" and 113" and the margin portions 114" and 115" may contain $BaTiO_3$ as a main component, and may not contain $(Ba_{1-x}Ca_x)TiO_3$ $(0.01 \leq x \leq 0.15)$. In this case, the dielectric layer 111 of the capacitance formation portion Ac may have a form of the dielectric crystal grain illustrated in FIG. 4, and the cover portions 112" and 113" and the margin portions 114" and 115" may have a form of the dielectric crystal grain illustrated in FIG. 5.

In an embodiment, when a ratio of an area occupied by pores among the cover portions 112" and 113", in a cross-section of the body 110" in the first and third directions, is S1, S1<S2. In this case, S1 and S3 may be 0.2 areas or less, and S2 may exceed 0.2 area % and may be 0.4 areas or less.

As set forth above, according to one effect of the various effects of the present disclosure, high-temperature reliability may be improved by including $BaTiO_3$ and $(Ba_{1-x}Ca_x)TiO_3$ ($0.01 \leq x \leq 0.15$) in a dielectric layer of a capacitance formation portion.

According to one effect of the various effects of the present disclosure, moisture-resistance reliability may be improved by lowering porosity by including $BaTiO_3$ in a cover portion and/or a margin portion.

Hereinafter, embodiments of the present disclosure will now be described in detail with reference to the accompanying drawings. The present disclosure, however, may be embodied in many different forms and should not be construed as being limited to the embodiments set forth herein. However, various and beneficial advantages and effects of the present disclosure are not limited to the above, and will be more easily understood in the course of describing specific embodiments of the present disclosure.

In addition, the expression 'an embodiment' used in the present disclosure does not mean the same embodiment as each other, and is provided to emphasize and explain different unique features. However, an embodiment presented above is not excluded from being implemented in combination with the features of another embodiment. For example, even if a matter described in one specific embodiment is not described in another embodiment, it may be understood as a description related to another embodiment unless a description contradicts or contradicts the matter in another embodiment.

The terms used in the present disclosure are used to describe only one embodiment, and are not intended to limit the present disclosure. In this case, the singular expression includes the plural expression unless the context clearly indicates otherwise.

While example embodiments have been shown and described above, it will be apparent to those skilled in the art that modifications and variations could be made without departing from the scope of the present disclosure as defined by the appended claims.

What is claimed is:

1. A ceramic electronic component, comprising:
a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the first internal electrode; and
a second external electrode disposed on the fourth surface and connected to the second internal electrode,
wherein:
the body includes:
  a capacitance formation portion including the first and second internal electrodes to form capacitance, and
  a cover portion disposed on both end surfaces of the capacitance formation portion in the first direction,
the dielectric layer includes $BaTiO_3$ and $(Ba_{1-x}Ca_x)TiO_3$, $0.01 \leq x \leq 0.15$,
the cover portion includes $BaTiO_3$, and
in a cross-section of the body in the first and third directions, a ratio of an area occupied by pores in the cover portion is S1, a ratio of an area occupied by pores in the dielectric layer is S2, and S1<S2.

2. The ceramic electronic component of claim 1, wherein S1 is 0.2 area % or less, and
S2 exceeds 0.2 area % and is 0.4 area % or less.

3. The ceramic electronic component of claim 1, wherein the cover portion is free of $(Ba_{1-x}Ca_x)TiO_3$, $0.01 \leq x \leq 0.15$.

4. The ceramic electronic component of claim 1, wherein the dielectric layer contains $(Ba_{1-x}Ca_x)TiO_3$, $0.01 \leq x \leq 0.15$, in an amount of 30 moles or more and 300 moles or less relative to 100 moles of $BaTiO_3$.

5. The ceramic electronic component of claim 1, wherein a crystal grain containing $(Ba_{1-x}Ca_x)TiO_3$, $0.01 \leq x \leq 0.15$, as a main component is a first crystal grain, and a crystal grain containing $BaTiO_3$ as a main component is a second crystal grain,
the dielectric layer comprises the first and second crystal grains, and
the cover portion comprises the second crystal grain.

6. The ceramic electronic component of claim 5, wherein an average size of the first crystal grain is greater than an average size of the second crystal grain.

7. The ceramic electronic component of claim 6, wherein the average size of the first crystal grain is 210 to 340 nm, and the average size of the second crystal grain is 160 to 290 nm.

8. A ceramic electronic component, comprising:
a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the first internal electrode; and
a second external electrode disposed on the fourth surface and connected to the second internal electrode,
wherein:
the body includes:
  a capacitance formation portion including the first and second internal electrodes to form capacitance,
  a cover portion disposed on both end surfaces of the capacitance formation portion in the first direction, and
  a margin portion disposed on both end surfaces of the capacitance formation portion in the third direction,
the dielectric layer includes $BaTiO_3$ and $(Ba_{1-x}Ca_x)TiO_3$, $0.01 \leq x \leq 0.15$,
the margin portion includes $BaTiO_3$, and
in a cross-section of the body in the first and third directions, a ratio of an area occupied by pores in the margin portion is S3, a ratio of an area occupied by pores in the dielectric layer is S2, and S3<S2.

9. The ceramic electronic component of claim 8, wherein S3 is 0.2 area % or less, and
S2 exceeds 0.2 area % and is 0.4 area % or less.

10. The ceramic electronic component of claim 8, wherein the margin portion is free of $(Ba_{1-x}Ca_x)TiO_3$, $0.01 \leq x \leq 0.15$.

11. The ceramic electronic component of claim 8, wherein the dielectric layer contains $(Ba_{1-x}Ca_x)TiO_3$, $0.01 \leq x \leq 0.15$, in an amount of 30 moles or more and 300 moles or less respective to 100 moles of $BaTiO_3$.

12. The ceramic electronic component of claim 8, wherein, when a crystal grain containing $(Ba_{1-x}Ca_x)TiO_3$, $0.01 \leq x \leq 0.15$, as a main component is a first crystal grain, and a crystal grain containing $BaTiO_3$ as a main component is a second crystal grain, the dielectric layer includes the first and second crystal grains, and the margin portion includes the second crystal grain.

13. The ceramic electronic component of claim 12, wherein an average size of the first crystal grain is greater than an average size of the second crystal grain.

14. The ceramic electronic component of claim 13, wherein the average size of the first crystal grain is 210 to 340 nm, and the average size of the second crystal grain is 160 to 290 nm.

15. The ceramic electronic component of claim 8, wherein the cover portion comprises $BaTiO_3$, and in a cross-section of the body in the first and third directions, a ratio of an area occupied by pores in the cover portion is S1, and S1<S2.

16. The ceramic electronic component of claim 15, wherein S1 and S3 are 0.2 area % or less, and S2 exceeds 0.2 area % and is 0.4 area % or less.

17. A ceramic electronic component, comprising:

a body including a dielectric layer and first and second internal electrodes alternately disposed with the dielectric layer interposed therebetween in a first direction, the body having first and second surfaces opposing each other in the first direction, third and fourth surfaces connected to the first and second surfaces and opposing each other in a second direction, and fifth and sixth surfaces connected to the first to fourth surfaces and opposing each other in a third direction;

a first external electrode disposed on the third surface and connected to the first internal electrode; and a second external electrode disposed on the fourth surface and connected to the second internal electrode, wherein:

the body includes:

a capacitance formation portion including the first and second internal electrodes to form capacitance, and a margin portion disposed on both end surfaces of the capacitance formation portion in the third direction, the dielectric layer includes $BaTiO_3$ and $(Ba_{1-x}Ca_x)TiO_3$, $0.01 \leq x \leq 0.15$, and the margin portion includes $BaTiO_3$ and is free of $(Ba_{1-x}Ca_x)TiO_3$, $0.01 \leq x \leq 0.15$.

18. The ceramic electronic component of claim 17, wherein in a cross-section of the body in the first and third directions, a ratio of an area occupied by pores in the margin portion is S3, a ratio of an area occupied by pores in the dielectric layer is S2, and S3<S2.

19. The ceramic electronic component of claim 17, wherein the body further includes a cover portion disposed on both end surfaces of the capacitance formation portion in a first direction, and the cover portion comprises $BaTiO_3$ and is free of $(Ba_{1-x}Ca_x)TiO_3$, $0.01 \leq x \leq 0.15$.

20. The ceramic electronic component of claim 19, wherein in a cross-section of the body in the first and third directions, a ratio of an area occupied by pores in the cover portion is S1, a ratio of an area occupied by pores in the dielectric layer is S2, and S1<S2.

* * * * *